(12) United States Patent
Morita

(10) Patent No.: US 6,721,656 B2
(45) Date of Patent: Apr. 13, 2004

(54) GPS RECEIVING APPARATUS

(75) Inventor: Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/098,464

(22) Filed: Mar. 18, 2002

(65) Prior Publication Data

US 2002/0138198 A1 Sep. 26, 2002

(30) Foreign Application Priority Data

Mar. 21, 2001 (JP) ......................................... 2001-080944

(51) Int. Cl.⁷ ................................................. G01C 21/26
(52) U.S. Cl. ........................................ 701/213; 701/215
(58) Field of Search ............................... 701/213, 215; 342/357.07, 357.02; 370/344, 319

(56) References Cited

U.S. PATENT DOCUMENTS 5,808,581 A  9/1998  Braisted et al. .......... 342/357.2

FOREIGN PATENT DOCUMENTS

| JP | 04324384 A | 11/1992 |
| JP | 10253739 A | 9/1998 |
| JP | 10253740 A | 9/1998 |
| JP | 11118896 A | 4/1999 |
| JP | 11226094 A | 2/2001 |

Primary Examiner—Marthe Y. Marc-Coleman
(74) Attorney, Agent, or Firm—Birch, Stewart, Kolasch & Birch, LLP

(57) ABSTRACT

The present invention relates a GPS receiving apparatus having improved measurement precision as the result of selectively fetching only some of the signals transmitted by a number of satellites. The GPS receiving apparatus includes an antenna for receiving the electric waves from the satellites, an elevation-angle-computing unit for finding an elevation angle of each satellite on the basis of the electric wave received from the satellite, and a comparison unit for comparing the elevation angle with a predetermined reference elevation angle. Only electric waves transmitted by those satellites having an elevation angle greater than a predetermined reference elevation angle are selectively used for computing a position.

12 Claims, 5 Drawing Sheets

GPS RECEIVING APPARATUS

CROSS-REFERENCE TO RELATED APPLICATIONS

The present application claims priority under 35 U.S.C. §119 to Japanese Patent Application No. 2001-080944, filed on Mar. 21, 2001, the entire contents thereof are hereby incorporated by reference.

BACKGROUND OF THE INVENTION

1. Field of the Invention

The present invention relates to a GPS receiving apparatus. More particularly, the present invention relates to a GPS receiving apparatus capable of improving measurement accuracy by selectively using only some of the GPS signals transmitted by a number of satellites.

2. Description of the Prior Art

As a navigation system employed in a moving body such as a car and a vessel, in Japanese Patent Laid-open No. Hei 4-324384, there has been disclosed an apparatus for determining the position of the moving body on the basis of GPS (Global Positioning System) signals, with each signal being an electric received by the apparatus from an artificial satellite. The GPS receiving apparatus for determining a position receives GPS signals from three or more artificial satellites. It then computes distance data and altitude data from navigation messages transmitted by the artificial satellites, in order to find the position of the moving body.

As a GPS antenna, a planar antenna is adopted. The planar antenna is known as the so-called patch antenna having a disc-like shape with a diameter in the range 20 to 60 mm. In such a planar antenna, a number of antenna elements can be integrated so that its directivity in the vertical direction can be increased substantially. In addition, the planar antenna has a diversity configuration to provide a good reception condition.

When an electric wave transmitted by a satellite having a small angle of elevation such that the position of the satellite close to the horizon, the navigation system utilizing the GPS is adversely affected by a multipath, an ionized-layer delay, or the like. When this occurs, it is generally known that the precision of the system deteriorates. On the other hand, the planar antenna described above has a high directivity in the vertical direction, and a low sensitivity in the horizontal direction. Thus, a navigation system using such a planar antenna is only minimally affected by the multipath, the ionized-layer delay, or the like.

Given the above characteristics of a planar antenna, problems may occur if a planar antenna is employed in the GPS system of a moving body which changes its posture considerably during a movement. Despite the strong directivity of the planar antenna, when the moving body is put into an inclined posture, the electric wave output of a satellite having a small angle of elevation, unavoidably causes the precision of the GPS system to deteriorate. Examples of such a moving body where this problem occurs are a motor bicycle and a buggy car.

Similarly, if a non-directional antenna is employed, other problems occur. If a non-directional antenna is used to detect an electric wave in the vertical direction, and the moving body is in an inclined posture, such an antenna would receive not only an electric wave in the vertical direction, but also an electric wave in the horizontal direction.

Thus, with either of these conventional devices, the technological problems of deteriorating precision remain.

SUMMARY AND OBJECTS OF THE INVENTION

It is thus an object of the present invention to address the problems described above, by providing a GPS receiving apparatus capable of selectively acquiring only a GPS signal included in an electric wave transmitted by a satellite with a large angle of elevation.

In order to achieve the object described above, the present invention provides a GPS receiving apparatus for receiving GPS signals transmitted by a plurality of satellites. The GPS receiving apparatus includes an antenna for receiving the electric waves from the satellites; an elevation-angle-computing unit for finding an elevation angle of each satellite on the basis of the GPS signal received from the satellite; and a comparison unit for comparing the elevation angle of each of the satellite with a predetermined reference elevation angle. Only GPS signals transmitted by those satellites having an elevation angle greater than the predetermined reference elevation angle are selectively used.

In accordance with the characteristics described above, only GPS signals transmitted by those satellites having an elevation angle greater than the predetermined reference elevation angle are selectively used. Thus, a position can be computed with a high degree of precision without being adversely affected by a multipath, an ionized-layer delay, or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
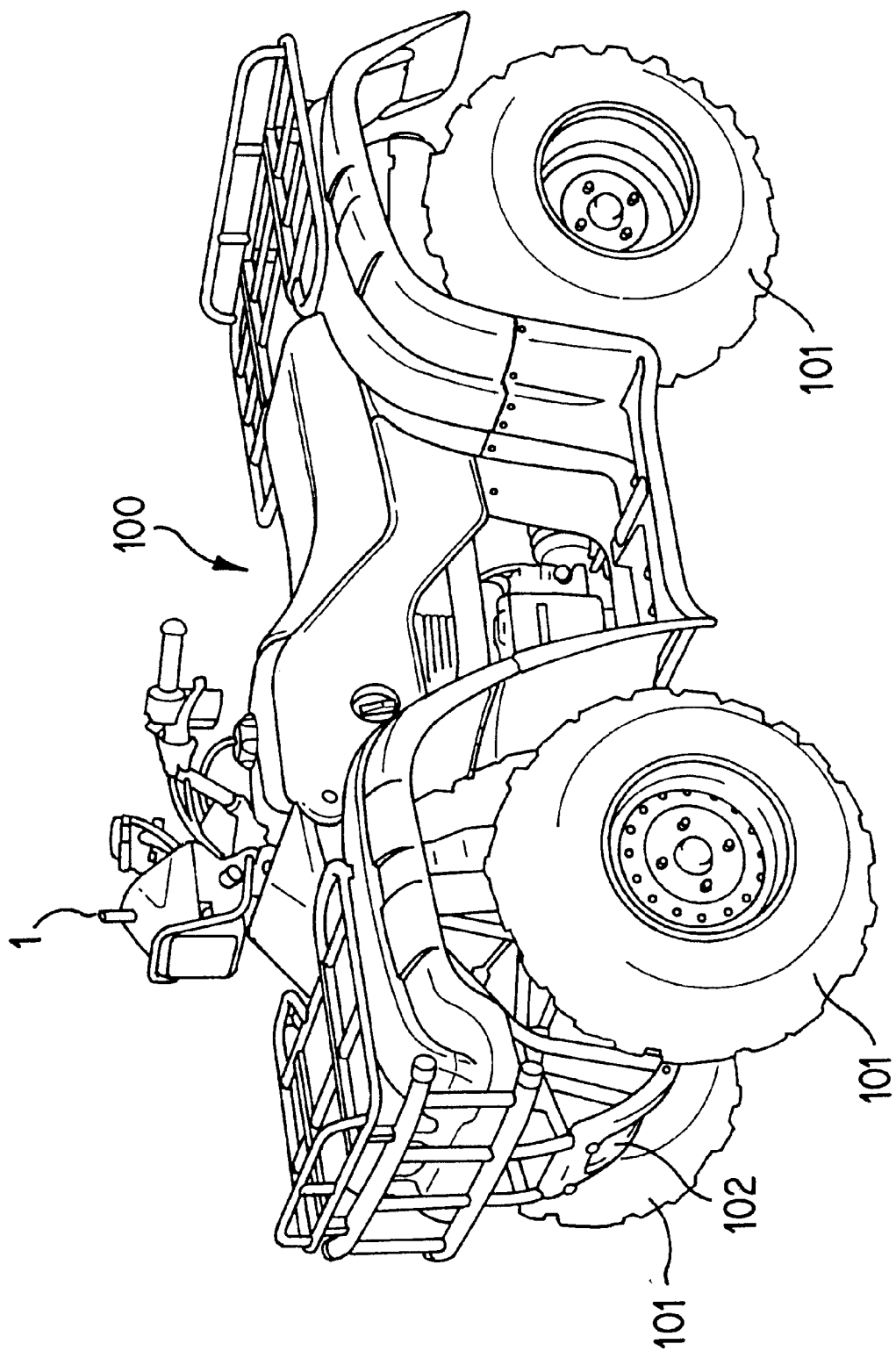
FIG. 1 is a perspective view of a buggy car, which has a saddle-sitting type, and is expected to be capable of improving the measurement precision by employing a GPS receiving apparatus provided by the present invention.

The present invention is described in detail by referring to diagrams as follows. FIG. 1 is a diagram showing a perspective view of a buggy car 100, which has a saddle-sitting type, and is expected to be capable of improving the measurement precision considerably by employing a GPS receiving apparatus provided by the present invention. The buggy car 100 drives components such as large-diameter wheels 101, an under cover 102 and a four-wheel driving mechanism to display a high ascending capability and high running-through performance. In this embodiment, a receiving antenna 1 of the GPS receiving system is set on the top of the front portion of the vehicle in a direction facing the sky.

The posture of such a moving body 100 changes significantly while the body is moving. Thus, the direction of the receiving antenna also changes with changes in posture of the body. Thus, with the moving body significantly inclined, the receiving antenna 1 is inevitably directed to a satellite at a small angle of elevation.

Figure 2:
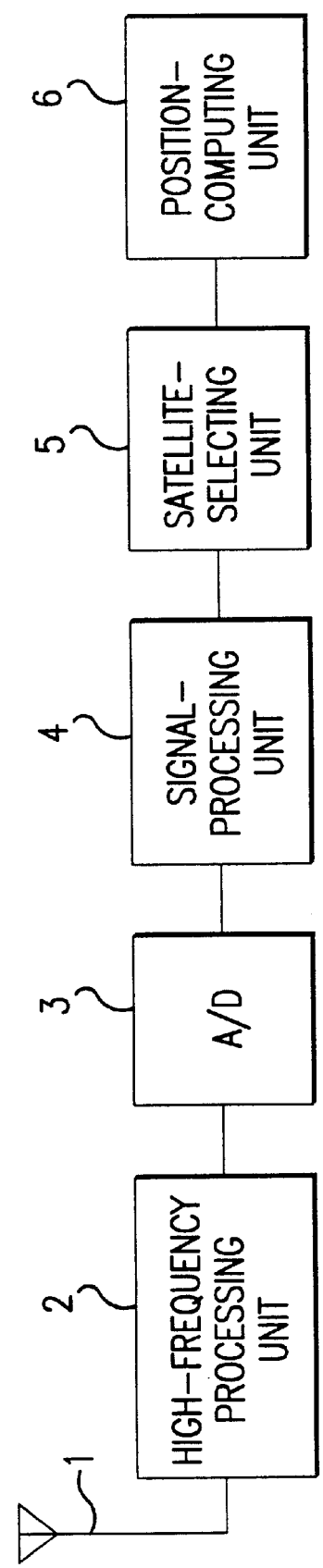
FIG. 2 is a block diagram showing the configuration of main components composing the GPS receiving apparatus implemented by an embodiment of the present invention.

FIG. 2 is a block diagram showing the configuration of main components composing the GPS receiving apparatus implemented by the embodiment of the present invention.

An example of the receiving antenna 1 is a helical antenna for receiving GPS signals transmitted by a plurality of GPS satellites. As compared to a conventional patch antenna provided on a planar plane, the receiving antenna 1 of the present invention has a low directivity.

A high-frequency processing unit 2 performs a down conversion by converting a high-frequency signal included in the electric wave received by the receiving antenna 1 into a signal having a frequency in a desired band. An A/D conversion unit 3 performs an A/D conversion by converting the analog signal obtained in the down conversion process into a digital signal. A signal-processing unit 4 extracts satellite navigation message from the digital signal which is outputted by the A/D conversion unit 3.

A satellite-selecting unit 5 extracts position information of all satellites from the satellite navigation messages. Next, a position-computing unit 6 computes its own tentative present position by using extracted positions of the satellites. This is done by finding elevation angles of the satellites from the position information of the satellites and the computing its own tentative present position. Subsequently, the satellite-selecting unit 5 selects those satellites having an angle of elevation greater than a predetermined reference elevation angle θref among all the satellites, and extracts the satellite navigation messages therefrom. Finally, the position-computing unit 6 finds its own true present position by using position information of the selected satellites.

The position-computing unit 6 finds time information and position information of satellites from satellite navigation messages of the selected satellites. Then, a pseudo distance between each satellite and the GPS receiving apparatus is computed from a difference between a time the satellite transmits an electric wave and a time the GPS receiving apparatus receives the electric wave, as well as from a measured Doppler frequency. The position-computing unit 6 further computes the three-dimensional or two-dimensional position of the moving body, including an error of its own internal clock as an unknown variable.

Figure 3:
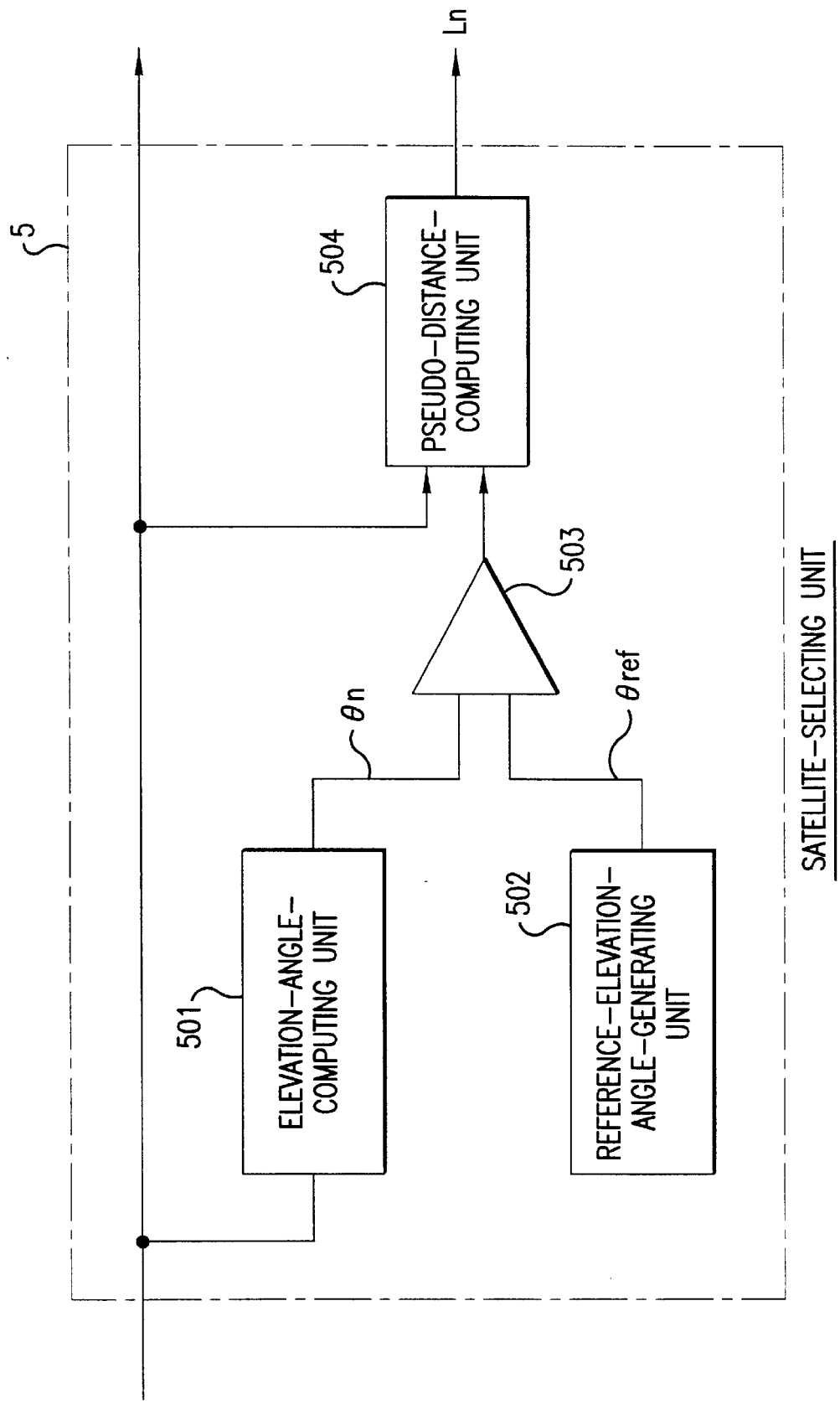
FIG. 3 is a functional block diagram showing a satellite-selecting unit shown in FIG. 2.

FIG. 3 is a functional block diagram showing the satellite-selecting unit 5, which comprises an elevation-angle-computing unit 501, a reference-elevation-angle-generating unit 502, a comparison unit 503 and a pseudo-distance-computing unit 504. The elevation-angle-computing unit 501 extracts position information of each satellite STn from the satellite navigation message, and then computes the elevation angle θn of the satellite STn. The reference-elevation-angle-generating unit 502 generates the reference elevation angle θref. The comparison unit 503 compares the computed elevation angle θn of each satellite STn with the reference elevation angle θref. The pseudo-distance-computing unit 504 computes a pseudo distance Ln to each satellite STn with an elevation angle θn greater than the reference elevation angle θref on the basis of the satellite navigation message. The position-computing unit 6 selectively takes only information of each satellite STn with an elevation angle θn greater than the reference elevation angle θref.

Figure 4:
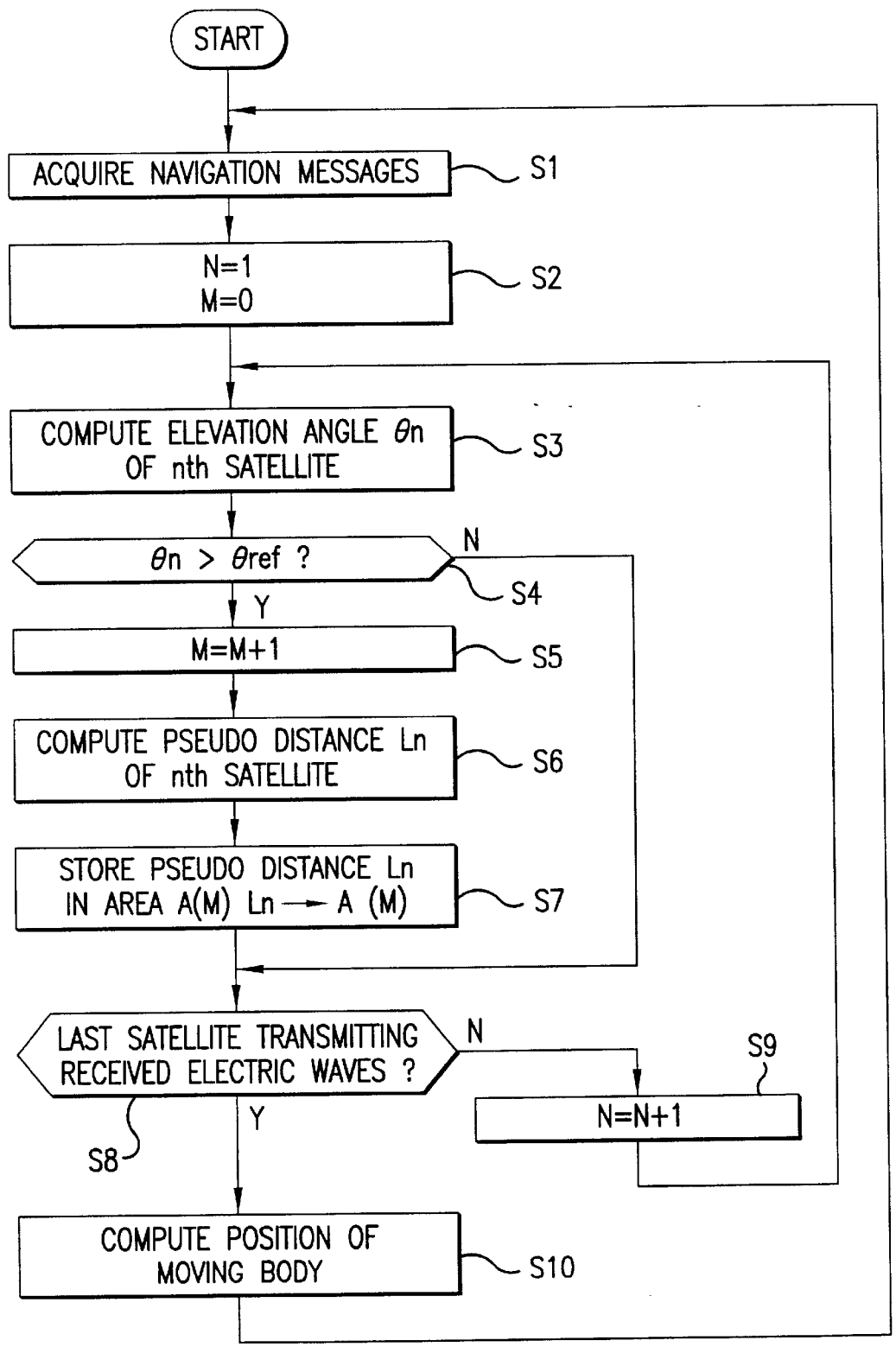
FIG. 4 is a flowchart representing the operation of the embodiment.
Figure 5:
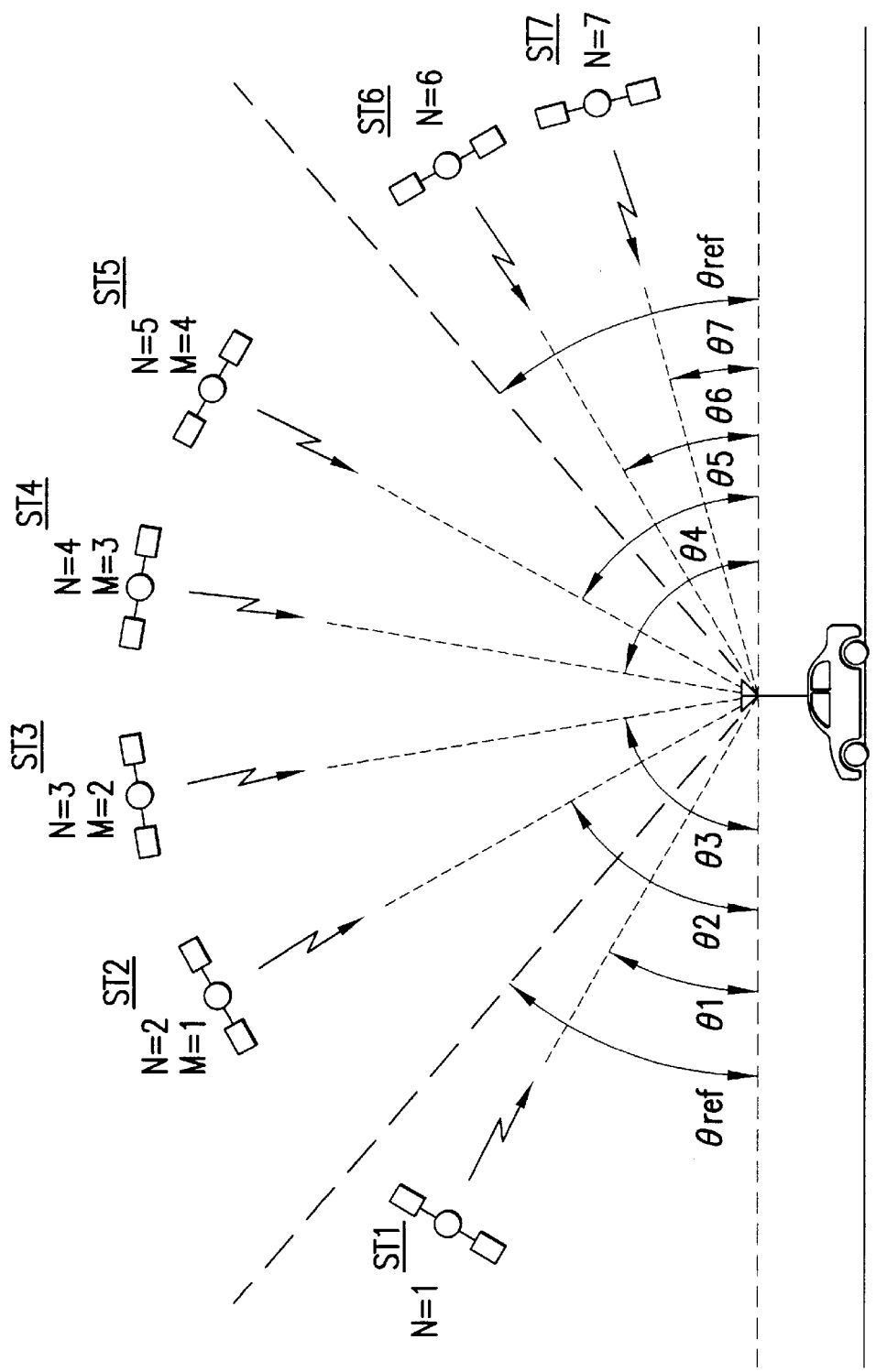
FIG. 5 is a diagram showing a model representing the operation of the present invention.

Next, the operation of the embodiment is explained by referring to a flowchart shown in FIG. 4 and the block diagram of FIG. 3. As shown in FIG. 5, this embodiment is explained as an embodiment capable of receiving electric waves from seven satellites ST1 to ST7.

At a step S1, the elevation-angle-computing unit 501 employed in the satellite-selecting unit 5 acquires a satellite navigation message transmitted from the first satellite ST1 from the signal-processing unit 4. Then, at a step S2, a variable N for identifying all satellites is set at 1. In this embodiment, the variable N can have a value in the range 1 to 7. Further, a variable M for identifying a selected satellite is set at 0. At a step S3, the elevation-angle-computing unit 501 computes the elevation angle θ1 of the Nth satellite ST1, where N is initially 1. At a step S4, the comparison unit 503 compares the computed elevation angle θ1 with the reference elevation angle θref.

Since the elevation angle θ1 of the satellite ST1 in this embodiment is smaller than the reference elevation angle θref as shown in FIG. 5, the flow of the operation goes on to a step S8 to form a judgment as to whether or not the satellite ST1 processed at this time is the last satellite ST7. The outcome of the present judgment indicates that there is another satellite that remains to be processed. In this case, the flow of the operation thus goes on to a step S9 at which the variable N is incremented. Then, the flow of the operation goes back to the step S3.

At the next step S3, the elevation-angle-computing unit 501 computes the elevation angle θ2 of the second satellite ST2. At the step S4, the comparison unit 503 compares the computed elevation angle θ2 with the reference elevation angle θref.

Since the elevation angle θ2 of the satellite ST2 in this embodiment is greater than the reference elevation angle θref as shown in FIG. 5, the flow of the operation goes on to a step S5 at which the variable M is incremented. At a step S6, the pseudo-distance-computing unit 504 computes a pseudo distance Ln of the second satellite, that is, a pseudo distance L2 of the satellite ST2 in this case. At a step S7, the pseudo distance L2 obtained as a result of computation is supplied to the position-computing unit 6 to be stored in a storage area A(M). That is to say, the pseudo distance L2 is stored in a storage area A(1).

The flow of the operation then goes on to the step S8 to form a judgment as to whether or not the satellite processed at this time is the last satellite. If the outcome of the present judgment indicates that there is another satellite which remains to be processed, the flow of the operation goes on to the step S9 at which the variable N is incremented. Then, the flow of the operation goes back to the step S3. The above pieces of processing are carried out repeatedly for each of the other satellites.

As described above, the above processing steps are performed repeatedly for each of the satellites ST1 to ST7. As a result, the position-computing unit 6 stores pseudo distances L2, L3, L4 and L5 of the satellites ST2 to ST5, each of which have an elevation angle θn greater than the reference elevation angle θref, and stores the pseudo distances L2, L3, L4 and L5 in storage areas A(1), A(2), A(3) and A(4) respectively as shown in FIG. 5.

At a step S10, the position-computing unit 6 computes the position of the moving body on the basis of the pseudo distances stored in the storage areas A(1), A(2), A(3) and A(4) and positional coordinates of the satellites.

In this embodiment, in order to correct a shift between time information of satellites and time information of the moving body, the shift is also computed as an unknown variable. Thus, the total number of unknown variables is four. The unknown variables other than the shift in time information are the three-dimensional coordinates of the moving body. Let notations (Xn, Yn, Zn) denote the positional coordinates of each satellite STn, notations (Xp, Yp, Zp) denote the positional coordinates of the moving body, notation C denote the speed of light, notation δt denote the shift of the receiver time and notation Ln denote the pseudo distance to each satellite STn.

In this case, the following simultaneous equations hold true:

$$\{(Xp-X1)^2+(Yp-Y1)^2+(Zp-Z1)^2\}^{1/2}+C*\delta t=L1$$

$$\{(Xp-X2)^2+(Yp-Y2)^2+(Zp-Z2)^2\}^{1/2}+C*\delta t=L2$$

$$\{(Xp-X2)^2+(Yp-Y3)^2+(Zp-Z3)^2\}^{1/2}+C*\delta t=L3$$

$$\{(Xp-X4)^2+(Yp-Y4)^2+(Zp-Z4)^2\}^{1/2}+C*\delta t=L4$$

The above simultaneous equations are solved to find the position of the moving body, which is treated as unknown variables, as a cross point among surfaces of four spheres, each having a center point coinciding with one of the satellites and a radius equal to the distance from the satellite.

In accordance with the present embodiment, only signals transmitted by those satellites having a large angle of elevation are selectively fetched to compute the position of the moving body. Thus, the position can be computed with a high degree of precision without being much affected by a multipath, an ionized-layer delay or the like.

In the embodiment described above, only four satellites have angles of elevation each exceeding the reference elevation angle θref. It should be noted, however, that five or more satellites may have angles of elevation each exceeding the reference elevation angle θref. In such a case, the position of the moving body can be computed on the basis of satellite navigation messages transmitted by four satellites selected in an order of decreasing angles of elevation. Thus, the position can be found with an even higher degree of precision.

The present invention exhibits the following effects:

1: Since only signals transmitted by satellites having a large angle of elevation are selectively fetched to compute the position of a moving body, the position can be computed with a high degree of precision. This prevents the navigation system of the moving body from being adversely affected by a multipath, an ionized-layer delay, or the like.

2: If a large number of satellites have large angles of elevation, the position of the moving body can be computed on the basis of satellite navigation messages transmitted by a plurality of satellites selected in an order of decreasing angles of elevation. Accordingly, the true position of the moving body can be found with an even higher degree of precision.

3: Even if the posture of the moving body is changed to any arbitrary orientation, the low-directivity antenna of the present invention results in selecting and using only those signals transmitted by satellites having a large angle of elevation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A GPS receiving apparatus for receiving GPS signals transmitted by a plurality of satellites, the GPS receiving apparatus comprising:

an antenna for receiving signals on a moving body, each including said GPS signal from a designated number of said satellites, while traveling the moving body having a changing posture with respect to said plurality of satellites;

elevation-angle-computing means for finding an elevation angle of each of said satellites on the basis of the GPS signal received from said satellite;

reference elevation angle generating means for generating a predetermined reference angle;

comparison means for comparing the elevation angle of each of said designated number of said satellites, one after another, with a predetermined reference elevation angle;

pseudo-distance-computing means for computing a pseudo distance to each of said satellites with the elevation angle greater than the predetermined reference angle on a basis of signals received from said satellites; and position computing means for receiving the pseudo distances from the pseudo-distance-computing means after the pseudo-distance-computing means receives the GPS signal from a last of said satellites, and then computing the position of said moving body, wherein only the GPS signals transmitted by some of said designated satellites, each having the elevation angle greater than the predetermined reference elevation angle, are selectively used by the position computing means for computing the position of said moving body.

2. The GPS receiving apparatus according to claim 1, said GPS receiving apparatus characterized by using only GPS signals transmitted by some of said satellites, each having an elevation angle greater than said predetermined reference elevation angle, wherein some of said satellites are selected on a priority basis according to an order of decreasing elevation angles.

3. The GPS receiving apparatus according to claim 1, wherein said antenna is a low-directivity antenna or a non-directional antenna.

4. The GPS receiving apparatus according to claim 3, wherein the antenna is a helical antenna.

5. The GPS receiving apparatus according to claim 4, wherein the antenna is mounted on a moving body.

6. The GPS receiving apparatus according to claim 1, further comprising a signal processing means for extracting a navigation message received from said satellites, and a position-computing means for computing a position of a moving body.

7. A GPS receiving apparatus for receiving GPS signals transmitted by a plurality of satellites, said GPS receiving apparatus comprising:

means for setting a number of satellites to be fetched;

an antenna mounted on a moving body for receiving signals, each including said GPS signal from said satellites;

signal processing means for extracting a navigation message received from said satellites;

elevation-angle-computing means for finding an elevation angle of each satellite on the basis of said GPS signal received from said satellite;

comparison means for comparing said elevation angle of each of said satellite with a predetermined reference elevation angle, wherein said satellites to be fetched are fetched on a priority basis according to an order of decreasing elevation angles, said comparison means comparing said elevation angle of each said fetched satellites with said predetermined reference angle in a serial manner until a comparison is made for each of the fetched satellites, pseudo-distance-computing means for computing pseudo distance to each of said of satellites with the elevation angle greater than the predetermined reference angle on a basis of signals received from said satellites; and position computing means for receiving the pseudo distances from the pseudo-distance-computing means after the pseudo-distance-computing means receives the GPS signal from a last of said satellites, and then computing the position of said moving body, wherein only GPS signals transmitted by some of said fetched satellites, each having the elevation angle greater than said predetermined reference elevation angle, are selectively used by the position computing means for computing the position of said moving body.

8. A GPS receiving apparatus according to claim 7, wherein said antenna is a low-directivity antenna or a non-directional antenna.

9. A GPS receiving apparatus according to claim 8, wherein the antenna is a helical antenna.

10. A method of determining a position of a moving body having a changing posture relative to a horizon using a GPS receiving apparatus comprising an antenna, an elevation-angle-computing means, a comparison means, and a position-computing means, the method comprising the steps of:

setting a number of satellites to be fetched;

acquiring a GPS signal from satellites via the antenna;

computing an elevation angle of each of said satellites in the elevation-angle-computing means;

comparing the elevation angle of each of said fetched satellites with a predetermined reference elevation angle in the comparison means, the step of comparing each of said elevation angles with said predetermined reference angle is performed starting with the satellite having a highest elevation angle and continuing serially in an order of descending satellite elevation angle, the step of comparing stopping after the elevation angle of each of the fetched satellites has been compared;

computing and storing pseudo distances for only said GPS signals transmitted by those of said fetched satellites having the elevation angle greater than said reference elevation angle;

forming a judgment as to whether or not the satellite being processed is a last of the satellites; and if the satellite being processed is the last satellites, then computing a position of said moving body in the position-computing means based on signals by those GPS signals transmitted by those of said fetched satellites having an elevation angle greater than said reference angle.

11. The method of determining a position of a moving body having a changing posture relative to a horizon using a GPS receiving apparatus to claim 10, wherein said antenna is a low-directivity antenna or a non-directional antenna.

12. The method of determining a position of a moving body having a changing posture relative to a horizon using a GPS receiving apparatus to claim 11, wherein the antenna is a helical antenna.

* * * * *